UNITED STATES PATENT OFFICE 2,378,436

TERPENE DERIVATIVES

Alfred L. Rummelsburg, Wilmington, Del., assignor to Hercules Powder Company, Wilmington, Del., a corporation of Delaware No Drawing. Application May 31, 1941,
Serial No. 396,217

17 Claims. (Cl. 260—62)

This invention relates to a new series of terpene derivatives and to methods for their production; more particularly, it relates to condensation products of acyclic terpenes having three double bonds per molecule and a phenol, and to methods for their production.

In accordance with this invention, an acyclic terpene having three double bonds per molecule is reacted with a phenol in the presence of an acid catalyst. The resulting product consists primarily of an aromatic ether but also contains substituted hydroxy-aromatic (phenolic) compounds. Inasmuch as both of these types of compounds are always present in the reaction product, it appears as though conditions of equilibrium in this type of reaction require the presence of both types of compounds.

In accordance with this invention any acyclic terpene having three double bonds and having the general formula $C_{10}H_{16}$ may be employed for the reaction. Thus, allo-ocimene, ocimene, myrcene, etc., may be employed. However, it is preferred to employ the particular compound, allo-ocimene. This acyclic terpene, in addition to having three double bonds per molecule, has them in a triply conjugated system. Hereinafter, in this specification, an acyclic terpene having three double bonds per molecule will be referred to for convenience merely as an acyclic terpene.

The acyclic terpene employed may be used in any of its monomeric or polymeric forms. To obtain the polymeric form from the monomer, any of the processes known in the art are contemplated. For illustration, in the case of allo-ocimene, it is desired to include allo-ocimene polymerized with phosphoric acid catalysts, such as, orthophosphoric acid, tetraphosphoric acid, hypophosphoric acid, metaphosphoric acid, pyrophosphoric acid, etc., also with metal halide catalysts, such as, stannic chloride, aluminum chloride, zinc chloride, boron trifluoride and its molecular complexes with ethers and acids, etc. The polymerization may be carried out with or without the use of an inert, volatile, organic solvent, such as, benzene, xylene, gasoline, ethylene dichloride, etc. For additional information relating to the particular procedures which may be employed, see my co-pending applications for United States Letters Patent, Serial No. 370,664, filed December 18, 1940, and Serial No. 370,665, filed December 18, 1940.

When a polymerized acyclic terpene is employed in the processes of this invention, it is preferable to use a substantially pure dimer. This results from the fact that the increased unsaturation of the acyclic terpene dimer, as compared with that of the higher polymers, facilitates the condensation. Thus, when polymerization is carried out with a phosphoric acid catalyst, a liquid product is formed comprising a substantial quantity of the dimer. In actual practice, the product will contain from about 75% to about 95% of the dimer, depending upon the conditions of reaction, such as, type of phosphoric acid used, the concentration of catalyst, the particular solvent, temperature of reaction, etc. The thiocyanate value of the product may vary from about 120 to about 240. If desired, after the catalyst has been removed, the substantially pure dimer may be separated from the remaining constituents using reduced pressure distillation. The substantially pure dimer, in the case of allo-ocimene, will be found to have the following average characteristics:

Boiling point (4 mm.) _____°C\_\_ 142–143
$d_o^{23}$ _____ 0.8654
$n_d^{23}$ _____ 1.508

In carrying out the polymerization with metal halide catalysts, liquid polymers may also be obtained following the procedure as cited in my co-pending application for United States Letters Patent, Serial No. 370,664, filed December 18, 1940; however, by employing particular metal halides and suitably controlling the conditions of the reaction, solid polymers of acyclic terpenes result. For example, when a metal chloride, and preferably aluminum chloride, is used, generally solid polymers result. These solid polymers are formed when the reaction is carried out over wide ranges of temperature and using various inert solvents. Preferably, however, to form solid polymers, the reaction is carried out at a temperature within the range of from about −35° C. to about 60° C. with the acyclic terpene dissolved in a halogenated organic solvent, such as, ethylene dichloride, etc.

These solid polymers which are prepared by the processes above described contain substantial quantities of polymeric constituents higher than the dimer. It has been determined that these organic solids have at least about 70% of polymeric constituents higher than the dimer. They are further characterized by having lower thiocyanate values than the liquid polymers, the values for the former falling within the range of from about 20 to about 80.

By employing an acyclic terpene in any of its monomeric or polymeric modifications, as hereinabove described, condensation products may be formed by reaction with any desirable phenolic-type compound. It is contemplated that there be included in this category any hydroxy-aromatic compound in which the hydroxy group is directly attached to an aromatic ring. Hereinafter, in the specification and claims, such a material will be referred to as "a phenol." Thus, monocyclic hydroxy-aromatic compounds may be employed. These compounds comprise monohydric compounds, such as, phenol; dihydric compounds, such as, quinol, catechol, resorcinol, etc.; trihydric compounds, such as, pyrogallol, hydroxy quinol, phloroglucinol, etc. Polycyclic hydroxyaromatic compounds may be used and these compounds may be mono- or polyhydric, for example, α-naphthol, β-naphthol, the dihydroxy-naphthalenes, etc. Furthermore, halogen substitution products of the foregoing single and poly ring hydroxy-aromatic compounds may be employed, for example, ortho-, meta-, and para-monochlorophenol, the dichlorophenols, the trichlorophenols, the tetrachlorophenols, pentachlorophenol, etc.; also nitrogen substitution products, such as, mononitrophenol, the dinitrophenols, the trinitrophenols, etc. In addition, mono- and polyhydrocarbon substitution products of the foregoing mono- and polycyclic hydroxy-aromatic compounds, for example, the cresols, the xylenols, ethyl phenol, propyl phenol, butyl phenol, iso-amylphenol, etc., may be employed.

In carrying out this invention a condensation catalyst is required for the reaction. Operable catalysts include the acids, such as, p-toluene sulfonic acid, sulfuric acid, hydrochloric acid, phosphoric acid, perchloric acid, hydrofluoric acid, fluoboric acid, acetyl sulfuric acid, chloroaluminic acid, etc.; metal halides, such as, aluminum trichloride, stannic chloride, boron trifluoride and its molecular complexes with ethers and organic acids, etc.; also phosphorus pentoxide. Preferably, the amount of catalyst employed should be within the range of from about 0.5% to about 2.0% based on the acyclic terpene or polymerized acyclic terpene.

An inert solvent for the reactants may be employed if desired. The use of an inert solvent is particularly advantageous when a solid polymer of an acyclic terpene is being employed; also when a phenol which is either insoluble or difficultly soluble in the acyclic terpene is being employed in the condensation. Suitable solvents comprise saturated petroleum hydrocarbons, such as, petroleum ether, gasoline, cyclohexane, etc.; substituted hydrocarbons, such as carbon tetrachloride, ethylene dichloride, etc.; ethers, such as, ethyl, methyl, isopropyl, etc.; esters, such as, methyl acetate, ethyl acetate, etc.; aromatic-hydrocarbons, such as toluene, xylene, etc.

The condensation reaction inherent in this invention is generally exothermic. Normally, in carrying out the reaction, the reactants, together with the catalyst, are heated to the reaction temperature of the mixture. This temperature may vary, depending upon the particular phenol and monomeric or polymeric acyclic terpene employed, between room temperature and about 200° C. However, in some instances reaction commences immediately without the addition of heat. In most cases, after the reaction has commenced no further addition of heat is required. However, it may be desired, after it appears that there is no further reaction taking place as evinced by a fall in temperature of the reaction mixture, to heat the mixture at a temperature within the range of from about 80° C. to about 200° C. to insure complete reaction of the constituents. Where a monohydroxy-aromatic compound is employed in the reaction, equi-molecular or other than equi-molecular proportion of the reactants may be used. Preferably, the monohydroxy-aromatic compound will be employed in an amount between a 20% and a 100% excess of equi-molecular proportions. Where a polyhydroxy-aromatic compound is employed, generally less of said polyhydroxy-aromatic compound will be employed than will be used for a monohydroxy-aromatic compound. For example, in the case of catechol, a minimum of half a mol is required per mol of acyclic terpene since two reactive hydroxy groups are present. Theoretically, it is believed that one molecule of acyclic terpene or polymerized acyclic terpene reacts with each hydroxyl group present. Thus, the number of hydroxyl groups present in the hydroxy-aromatic compound employed will determine the theoretical proportion of reactants to use.

According to the preferred method of carrying out this invention, the phenol and the desired catalyst are first mixed and the acyclic terpene or polymerized acyclic terpene is then slowly added to the admixture. Under these conditions, there is obtained an improved temperature control, also lighter-colored products result. If the reaction is carried out in an inert atmosphere, such as, carbon dioxide, nitrogen, hydrogen, etc., additional improvements in color will be obtained.

Following the reaction period, the reaction mixture will be treated to remove the catalyst, any unreacted constituents and the solvent if one has been employed. If desired, the catalyst may be removed either preceding or following the removal of the unreacted constituents and the solvent which may be present. The catalyst may conveniently be removed by water washing the product. To accomplish the removal of unreacted constituents and the solvent which may be present, either vacuum or steam distillation may be employed.

When metal halides are employed as catalysts, a wash with an aqueous solution of an inorganic acid, such as, for example, sulfuric acid, hydrochloric acid, phosphoric acid, etc., prior to water washing and distillation assists in removing traces of metal halide complexes. In addition, the presence of traces of many of the catalysts in the product may be removed by treatment of the product or its solution in benzene, gasoline, etc., with a suitable adsorbent, such as, activated alumina, fuller's earth, diatomaceous earth, activated carbon, etc., or a selective solvent, such as, furfural, phenol, etc.

The following examples illustrate several specific embodiments of the principles of the instant invention which, however, are not to be construed as being limiting. All parts and percentages are by weight unless otherwise specified.

*Example 1*

A mixture of 750 parts of monomeric allo-ocimene (90% pure) and 520 parts of phenol was heated to 60° C. with 5 parts of p-toluene sulfonic acid at which temperature a vigorous exothermic reaction began. The mixture was cooled with ice to prevent violence and allowed to stand at a temperature of 40° C. for 10 hours, after which it was diluted with benzol and water washed. The benzol and unreacted constituents were removed by reduced pressure distillation to yield 1180 parts of a resinous condensate, having a hydroxyl content of 2.4% and a drop melting point of 35° C.

Example 2

450 parts of phenol were dissolved in 600 parts of monomeric allo-ocimene (95% pure). After adding 2.5 parts of p-toluene sulfonic acid and agitating, a vigorous exothermic reaction began. The reaction mixture was allowed to stand overnight in an atmosphere of $CO_2$. The product was steam distilled, water washed, and further distilled under reduced pressure to remove unreacted constituents. 730 parts of a soft resin which had a hydroxyl content of 3.0% and a drop melting point of 40° C. remained.

Example 3

To a mixture of 261 parts of monomeric allo-ocimene (60% pure) with 150 parts of cresol were added 3 parts of p-toluene sulfonic acid. The crude allo-ocimene contained in addition to the allo-ocimene small quantities of $\alpha$-pinene, dipentene and unidentified terpenes. The cresol employed was a mixture of the ortho-, meta-, and para-modifications. The mixture was allowed to stand for 12 hours at 50° C. and then heated to 200° C. under reflux for a period of 1 hour. The product was steam distilled and later washed with water to yield 280 parts of a soft resin, having a color of M on the rosin scale, a hydroxyl content of 2.5% and a drop melting point of 45° C.

Example 4

To a mixture of 500 parts of polymerized allo-ocimene, consisting substantially of the dimer and having a boiling point at 4 mm. of 150 to 165° C., and 270 parts of phenol was added one part of p-toluene sulfonic acid. The resulting mixture was heated for 15 hours at a temperature of from 150 to 170° C. Removal of the unreacted constituents by reduced pressure distillation, followed by a water wash left a residue of 520 parts of a resinous condensate, having a hydroxyl content of 2.0% and a drop melting point of 50° C.

Example 5

To a solution of 700 parts of heat polymerized allo-ocimene, consisting substantially entirely of the dimer, and 310 parts of phenol were added 36 parts of p-toluene sulfonic acid with agitation. An exothermic reaction took place at the completion of which the reaction mixture was allowed to cool to 35° C. and then dissolved in 572 parts of petroleum naphtha. The resulting solution was agitated with 20 parts of activated charcoal and filtered. The filtrate was rapidly washed with 5% $NaHCO_3$ solution and the solvent and unreacted constituents were removed by distillation using a bath temperature of 170° C. and a pressure of 3 to 20 mm. 544 parts of condensate remained. It had a hydroxyl content of 2.4% and a drop melting point of 62° C.

Example 6

To a mixture of 142 parts of cresol and 140 parts of liquid polymerized allo-ocimene, consisting substantially entirely of the dimer, were added 3 parts of p-toluene sulfonic acid with agitation. An exothermic reaction took place, after which the mixture was heated to 200° C. to insure complete reaction. The product was steam distilled to remove unreacted constituents, and water washed to remove the catalyst. 197 parts of a dark resinous condensate was obtained. It had a hydroxyl content of 2.2% and a drop melting point of 58° C.

Example 7

One hundred and forty-five parts of $\alpha$-naphthol and 150 parts of allo-ocimene (95% pure) were mixed and warmed until a homogeneous solution resulted. 5 parts of gaseous boron tri-fluoride were introduced into the solution at 30 to 50° C. over a period of 5 minutes with agitation. The reaction was exothermic. As the evolution of heat subsided, the mixture was warmed under reflux to 110° C. for two hours, cooled, water washed and then steam distilled to remove unreacted constituents. The resulting condensate was a solid resin, having a drop melting point of 60° C. and having a hydroxyl content of 3.0%.

Example 8

One hundred and forty-five parts of $\alpha$-naphthol and 300 parts of polymerized allo-ocimene consisting substantially entirely of the dimer were mixed and warmed until a homogeneous solution resulted. 5 parts of anhydrous aluminum trichloride were added with agitation. Following the exothermic reaction, the mixture was heated for 3 hours at 120° C., cooled and then washed with aqueous 10% sulfuric acid, then with water, and later subjected to reduced pressure distillation at 1 mm. and at a bath temperature of 180 to 240° C. in order to remove unreacted constituents. The resulting condensate was a solid resin having a drop melting point of 85° C. and a hydroxyl content of 2.0%.

Example 9

One hundred and fifty parts of a crude monochlorinated phenol, comprising substantially entirely a mixture of monochlorophenol isomers, were mixed with 100 parts of 97% monomeric allo-ocimene. To this mixture 3 parts of p-toluene sulfonic acid were added with agitation. Following an exothermic reaction, the mixture was heated to 125° C. and maintained at that temperature for 2 hours. After cooling, the reaction mixture was water washed, then steam distilled to remove unreacted constituents. The condensate was a viscous resin having a hydroxyl content of 4.0%.

The condensation products of this invention have a characteristically high reactivity with drying oils, such as, linseed, soybean, China-wood, etc. oils. This is in distinct contrast to the terpene-phenol condensates previously known in the art. The latter, due to their comparative low reactivity, cannot be advantageously employed in the production of varnishes. The preparation of condensation products by employing acyclic terpenes, in accordance with this invention, constitutes a solution to this vexatious problem.

The condensation products of this invention may be used as base materials for the preparation of emulsifying, wetting and sudsing agents. In particular, the sulfonation of these condensates yield products which show the aforesaid characteristics to a marked degree. These condensates may also be reacted with formaldehyde to form hard resins which may be used as such or incorporated in protective coatings. The formaldehyde reaction products, in turn, are reactive with drying oils; hence, these reaction products may be used in the manufacture of varnishes.

It will be understood that in accordance with this invention materials rich in an acyclic terpene or a polymerized acyclic terpene may be employed to produce the desired results although a substantially pure acyclic terpene or polymerized acyclic terpene is preferred. An impure allo-ocimene, for example, may be obtained in the pyrolysis of α-pinene. The resulting product, for example, may contain allo-ocimene in amount as high as 40%, along with other terpenes, and may, if desired be used instead of substantially pure allo-ocimene. Also, the pyrolysis of β-pinene yields as much as 70% myrcene, along with other cyclic terpenes. Such an impure myrcene may, if desired, be employed in accordance with the invention.

It will be understood that the details and examples hereinbefore set forth are illustrative only and that the invention as broadly described and claimed is in no way limited thereby.

This application constitutes a continuation-in-part of my application for United States Letters Patent, Serial No. 381,854, filed March 5, 1941.

What I claim and desire to protect by Letters Patent is:

1. The process of preparing a new composition of matter which comprises reacting a mixture of a phenol and a material selected from the group consisting of the monomers and polymers of an acyclic terpene having the general formula $C_{10}H_{16}$, in contact with a catalyst capable of bringing about a condensation of the mixture, at a reaction temperature of the mixture, until condensation is substantially complete.

2. The process of preparing a new composition of matter which comprises reacting a mixture of a phenol and a material selected from the group consisting of the monomers and polymers of an acyclic terpene having the general formula $C_{10}H_{16}$, in contact with an acid catalyst capable of bringing about a condensation of the mixture, at a reaction temperature of the mixture, until condensation is substantially complete.

3. The process of preparing a new composition of matter which comprises reacting a mixture of a phenol and a material selected from the group consisting of the monomers and polymers of an acyclic terpene having the general formula $C_{10}H_{16}$, in contact with a metal halide catalyst capable of bringing about a condensation of the mixture, at a reaction temperature of the mixture, until condensation is substantially complete.

4. The process of preparing a new composition of matter which comprises reacting a mixture of a phenol and a material selected from the group consisting of the monomers and polymers of an acyclic terpene having the general formula $C_{10}H_{16}$, in contact with p-toluenesulfonic acid, at a reaction temperature of the mixture, until condensation is substantially complete.

5. The process of preparing a new composition of matter which comprises reacting a mixture of a phenol and a material selected from the group consisting of the monomers and polymers of an acyclic terpene having the general formula $C_{10}H_{16}$, in contact with boron trifluoride, at a reaction temperature of the mixture, until condensation is substantially complete.

6. The process of preparing a new composition of matter which comprises reacting a mixture of a phenol and a material selected from the group consisting of the monomers and polymers of an acyclic terpene having the general formula $C_{10}H_{16}$, in contact with aluminum chloride, at a reaction temperature of the mixture, until condensation is substantially complete.

7. The process of preparing a new composition of matter which comprises reacting a mixture of a phenol and an acyclic terpene hydrocarbon having the general formula $C_{10}H_{16}$, in contact with p-toluenesulfonic acid, at a reaction temperature of the mixture, until condensation is substantially complete.

8. The process of preparing a new composition of matter which comprises reacting a mixture of phenol and allo-ocimene in contact with p-toluenesulfonic acid, at a reaction temperature of the mixture, until condensation is substantially complete.

9. The process of preparing a new composition of matter which comprises reacting a mixture of a phenol and polymers of an acyclic terpene having the general formula $C_{10}H_{16}$, in contact with boron trifluoride, at a reaction temperature of the mixture, until condensation is substantially complete.

10. The process of preparing a new composition of matter which comprises reacting a mixture of phenol and polymerized allo-ocimene in contact with boron trifluoride, at a reaction temperature of the mixture, until condensation is substantially complete.

11. The product produced in accordance with the process of claim 1.

12. The product produced in accordance with the process of claim 1 but where the material is allo-ocimene.

13. The product produced in accordance with the process of claim 1 but where the material is myrcene.

14. The product produced in accordance with the process of claim 1 but where the material is polymerized allo-ocimene.

15. The product produced in accordance with the process of claim 1 but where the material is dimeric allo-ocimene.

16. The product produced in accordance with the process of claim 8.

17. The product produced in accordance with the process of claim 10.

ALFRED L. RUMMELSBURG.